No. 705,434. Patented July 22, 1902.
G. W. PACKER.
SLAT FORMING MACHINE.
(Application filed Feb. 5, 1900.)
(No Model.) 5 Sheets—Sheet 1.

WITNESSES
Chas M Chambers.
Marvin Cramer

INVENTOR
George W. Packer.
By J. F. Steward
His Atty.

No. 705,434. Patented July 22, 1902.
G. W. PACKER.
SLAT FORMING MACHINE.
(Application filed Feb. 5, 1900.)
(No Model.) 5 Sheets—Sheet 2.
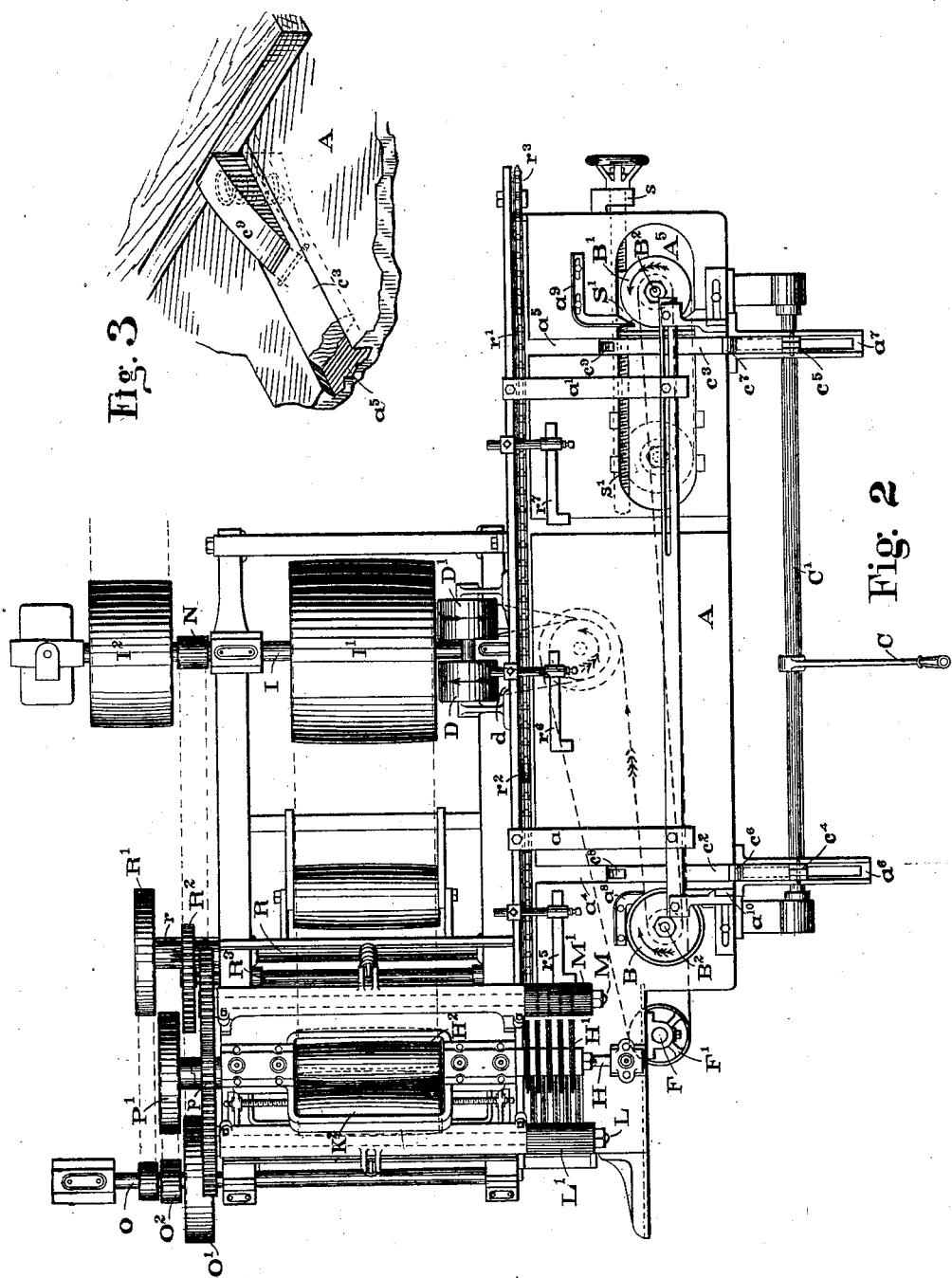
WITNESSES
INVENTOR
George W. Packer
By J. F. Steward
His Atty.

No. 705,434. Patented July 22, 1902.
G. W. PACKER.
SLAT FORMING MACHINE.
(Application filed Feb. 5, 1900.)
(No Model.) 5 Sheets—Sheet 3.
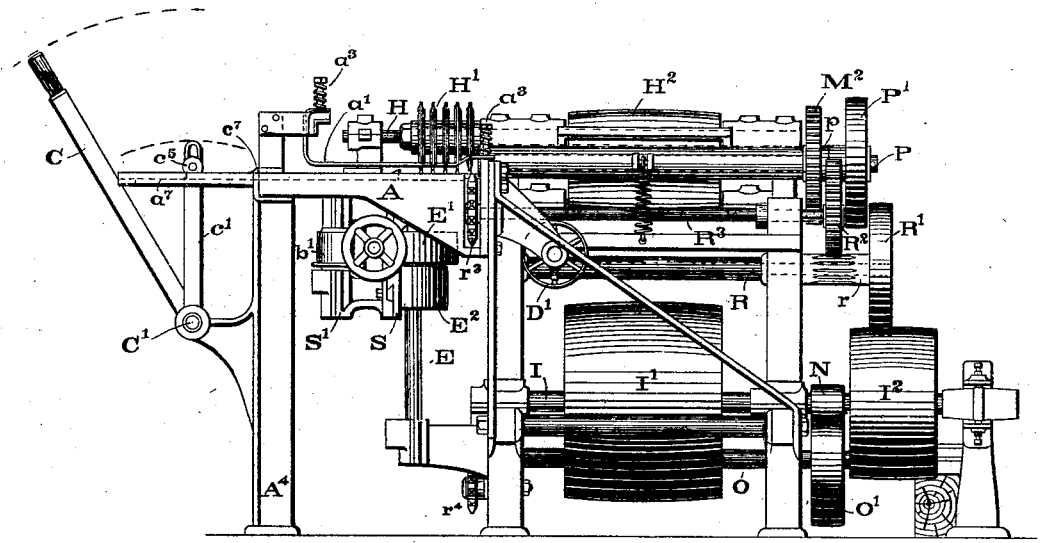
Fig. 4.
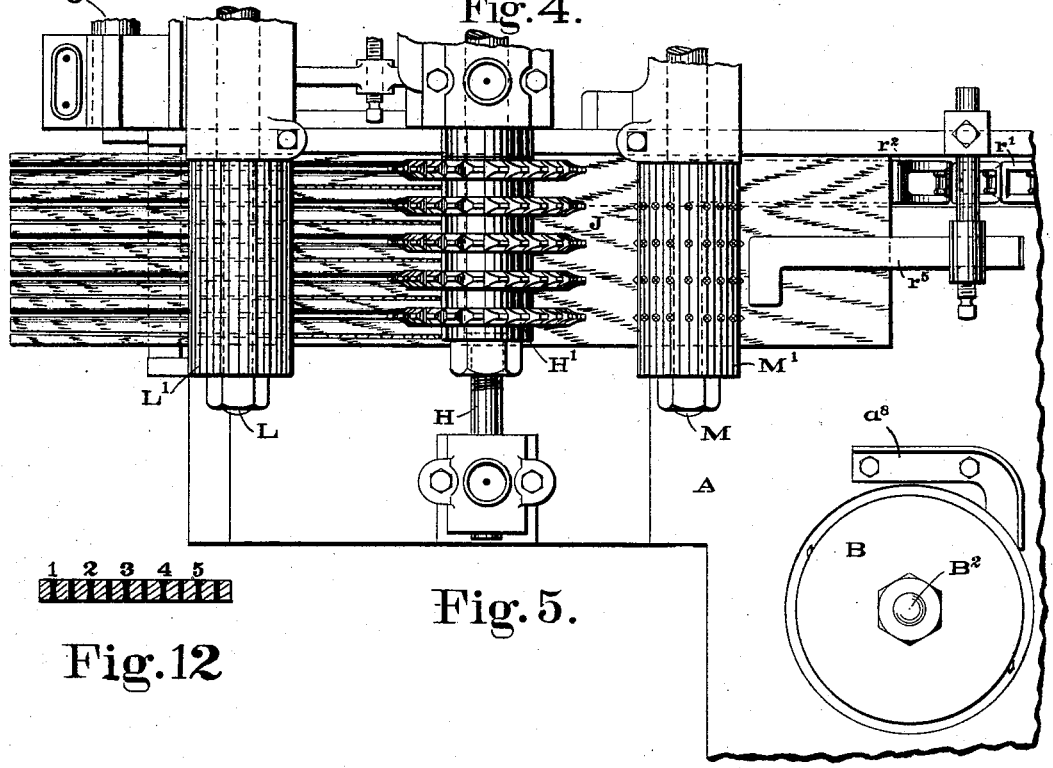
Fig. 5.
Fig. 12
WITNESSES
INVENTOR
THE NORRIS PETERS CO., PHOTO-LITHO., WASHINGTON, D. C.

No. 705,434. Patented July 22, 1902.
G. W. PACKER.
SLAT FORMING MACHINE.
(Application filed Feb. 5, 1900.)

(No Model.) 5 Sheets—Sheet 4.

WITNESSES
INVENTOR

No. 705,434. Patented July 22, 1902.
G. W. PACKER.
SLAT FORMING MACHINE.
(Application filed Feb. 5, 1900.)

(No Model.) 5 Sheets—Sheet 5.

WITNESSES. INVENTOR.

UNITED STATES PATENT OFFICE.

GEORGE W. PACKER, OF CHICAGO, ILLINOIS, ASSIGNOR TO DEERING HARVESTER COMPANY, OF CHICAGO, ILLINOIS.

SLAT-FORMING MACHINE.

SPECIFICATION forming part of Letters Patent No. 705,434, dated July 22, 1902.

Application filed February 5, 1900. Serial No. 4,039. (No model.)

*To all whom it may concern:*

Be it known that I, GEORGE W. PACKER, a citizen of the United States, residing at Chicago, in the county of Cook and State of Illinois, have invented certain new and useful Improvements in Slat-Forming Machines; and I do hereby declare the following to be a full, clear, and exact description of the invention, such as will enable others skilled in the art to which it appertains to make and use the same.

The object of my invention is to provide a machine which shall produce a number of finished slats or like product from a single larger piece of stock which is supplied to it. As here described, it is adapted to form slats such as are used on endless carriers for harvesting-machines, but may be used to form slats or like article of manufacture for any purpose whatever.

Figure 1:
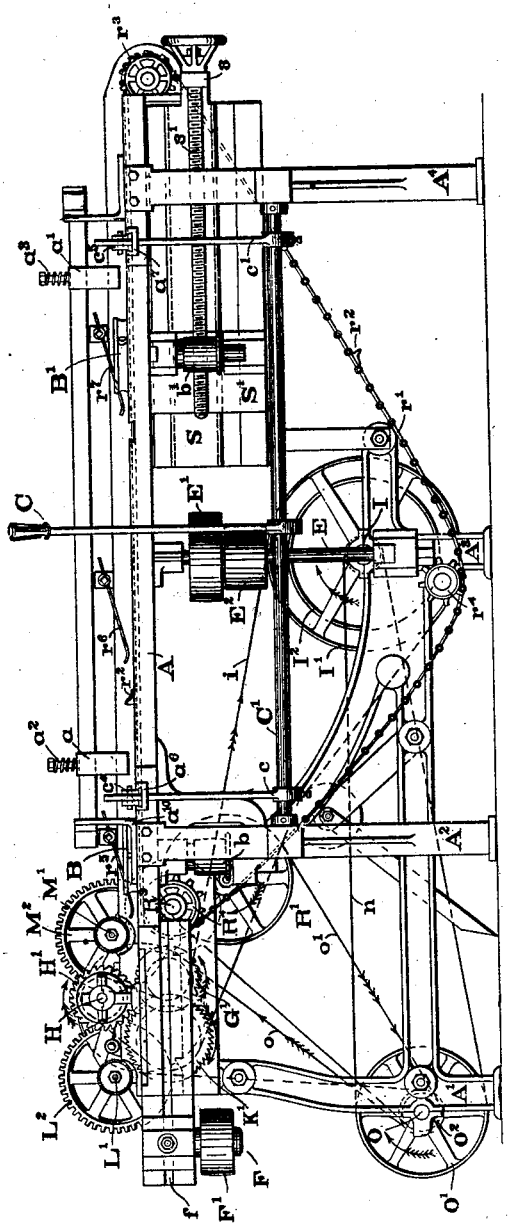
Figure 6:
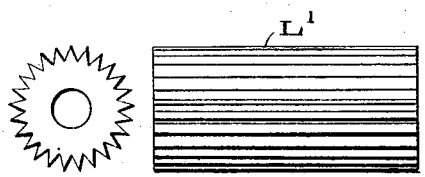
Figure 7:
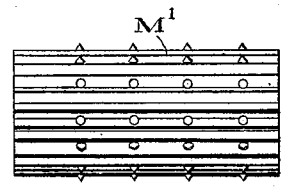
Figure 8:
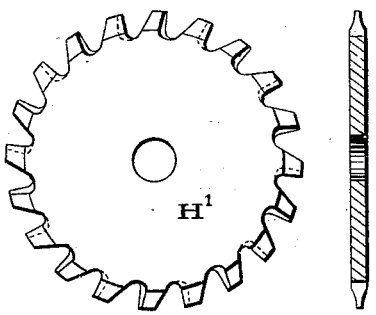
Figure 9:
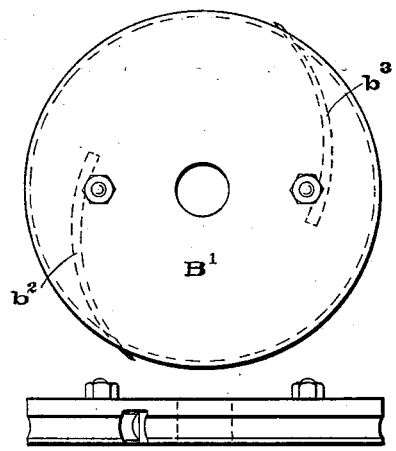
Figure 10:
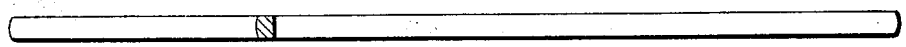
Figure 11:
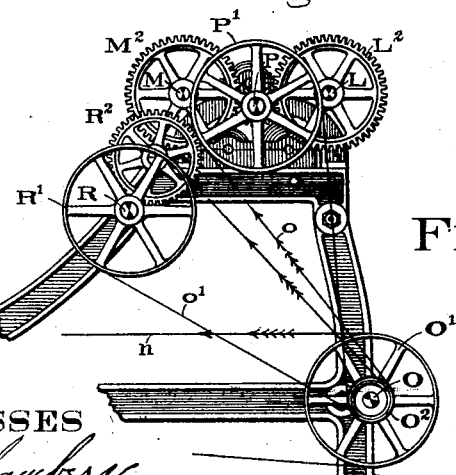
Figure 13:
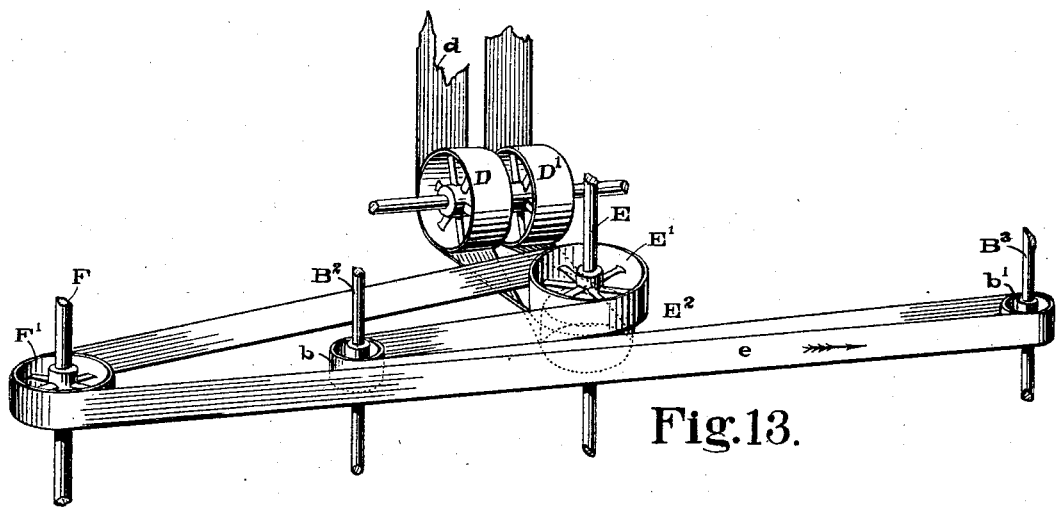
Figure 14:
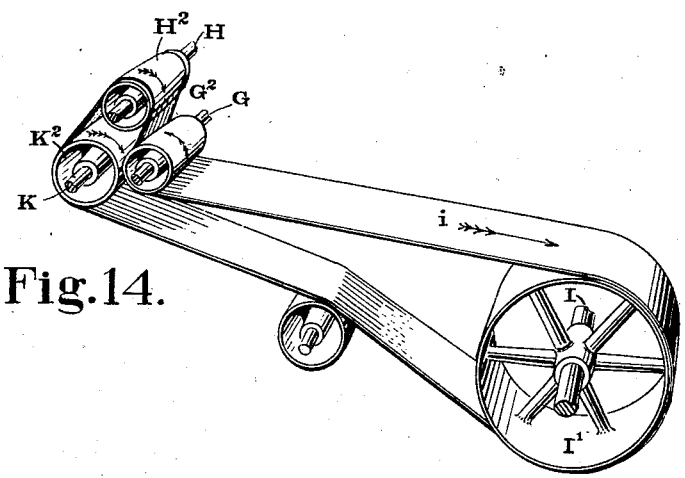

Figure 1 is a side elevation of my machine. Fig. 2 is a plan view. Fig. 3 is a perspective view showing the spring-stop and a portion of the slide and table. Fig. 4 is an end elevation having the feeding-rollers removed. Fig. 5 is a plan view of the feeding and sawing devices. Figs. 6 and 7 are respectively side and end views of the feeding-rollers. Fig. 8 is a side and sectional edge view of one of the cutters. Fig. 9 is a side and edge view of the cutter-heads for forming the ends of slats. Fig. 10 is a side view of one of the slats, showing also a sectional view as if cutting near one end. Fig. 11 is a rear view of a portion of my machine, showing driving mechanism for feeding devices. Fig. 12 is an end view of a board in the end of which the cutters have begun their work. Fig. 13 is a perspective view showing manner of belting and driving vertical cutter-heads. Fig. 14 is a perspective view showing the manner of belting and driving horizontal gangs of cutters and saws.

The general framework corresponds somewhat nearly with that of an ordinary sticker of the usual height.

A may be considered the bed portion of the machine, supported upon the legs $A'$, $A^2$, $A^3$, and $A^4$. Immediately above the bed-plate A are the cutters B and $B'$. To the action of these, boards, preferably planed upon both sides, are submitted by laying them on the bed and forcing them along, so that each end passes the cutter-heads. In the following manner A is a receiving-table, onto which the planed boards are sawed to a substantially uniform length, a length slightly greater than the finished slat.

In Figs. 1, 2, and 4 two bars $a$ and $a'$, held down by the springs $a^2$ and $a^3$, are shown. The operator stands by the side of the table in such a position that the lever C is within easy reach. In the upper surface of the table are the guides or grooves $a^4$ and $a^5$, in which move the slides $c^2$ and $c^3$.

$C'$ is a rock-shaft, to which the lever C is secured and to which also are secured the arms $c$ and $c'$. These arms pass up through slots in the extension $a^6$ and $a^7$, secured to the main table. The outward end of these slides is provided with the lugs $c^4$ and $c^5$. The upper ends of the arms $c$ and $c'$ are slotted. By movement of the lever C the arms $c$ and $c'$, and through them the slides $c^2$ and $c^3$, are moved. Upon the slides are the stops $c^6$ and $c^7$. With the cutter-heads, soon to be described, in proper position boards of suitable length are placed upon the slides against the stops $c^6$ and $c^7$. Movement of the lever forces the board thus placed between the cutter-heads, which round the ends thereof. The lever is next withdrawn and a new board put in place. Upon the slides are the spring-stops $c^8$ and $c^9$, one of which is shown in Fig. 3, where a spring (represented in dotted lines) is adapted to raise it to position. As the lever is brought backward these spring-stops draw beneath the board that has been forced through. When a new board to be operated upon is placed in position, the spring, having risen behind the edge of the board previously moved through, engages it and forces it to proper position to be given a longitudinal movement, and thus forced by the heads which subsequently operate upon it. If the operator desires, he may put a board in place and force it through between the cutter-heads and then, by a second movement, by the action of the stops $c^8$ and $c^9$ force it to position required for the subsequent operations. Upon the table are the guides $a^8$ and $a^9$. These guides prevent the boards from shifting endwise out of position after they have passed the cutter-heads.

$a^{10}$ is a guide against which one end of the board is placed and along which it moves when being operated upon by the cutter-heads. It serves, in short, mainly to locate the position in which the board should be placed.

The cutter-heads for rounding the ends of the boards may be of any suitable kind. That shown in Fig. 9 is one in common use. The machine being adapted particularly for making slats for harvesting-machines that should have rounded ends, the cutters are hollowed as required.

B' is the cutter-head, having grooves (shown in dotted lines in Fig. 9) in which the curved knives $b^2$ and $b^3$ (in dotted lines) are secured. The cutter-head B is shown as located in a definite position; but the cutter B' is adapted to be moved so as to operate upon boards of any desired length. The table A is slotted at $A^5$, preferably, so the cutter-head may, in part, be below the surface of the said table. These cutter-heads are mounted upon the vertical shafts $B^2$ and $B^3$ and are operated by belts, as shown in Fig. 13, where $d$ is a belt shown as coming from above. It passes under the idlers D and D' and around the pulley $E^2$. (Shown in dotted lines on the shaft E.) Upon this vertical shaft E is the driving-pulley E', and upon the shafts $B^2$ and $B^3$ of the cutter-heads are the pulleys $b$ and $b'$, which are driven by the driving-pulley E' by means of belt $e$. The pulley F', rotatably mounted upon vertical pin F, is adjustably supported on bearings upon the main frame, as shown in Figs. 1 and 2. In the main frame is a slot $f$, and into this the end of a bolt, which passes through the block in which the pin F is inserted and secures the said pulley F' in any position of adjustment. The purposes of this adjustment are to take up and let out the belt that operates the cutter-heads, because of the fact that they are adjustable. If the cutter-head B' is moved toward B, then the pulley F' is moved to the position shown in Fig. 1. The table upon which the boards are laid to have the ends trimmed by the cutter-heads is upon the same plane as that part of the table along which the boards move longitudinally in order to be slit and the slats rounded. Beneath the bed last referred to is a series of cutters G', secured upon the shaft G, as shown in Fig. 1. The teeth of these cutters rise a little distance above the plane of the table over which the boards to be operated upon move. Above this table and in such position as to work upon the board to be operated upon is a series of cutters H', mounted upon the shaft H, suitably journaled in bearings on the machine, as shown in Figs. 2, 4, and 5. These cutters and those below are adapted to operate upon the board and cut rounded tapering grooves, as shown at 1, 2, 3, 4, and 5 in Fig. 12. The disks of the cutters above and below cut sufficiently deep that their kerfs meet. These cutters are shown in detail in Fig. 8. Below the table, suitably supported upon the main frame, is the shaft I, having the pulley I' secured thereon. This shaft is operated by a belt thrown around the pulley $I^2$ from any convenient position. The belt $i$ on the pulley I', as shown in Figs. 14 and 1, passes under and over pulleys $G^2$ and $H^2$ on the shafts G and H, respectively, and thus moves the peripheries of the cutters G' and H' in the proper direction. The belt moves in the direction indicated by the arrow in Figs. 1 and 14, and it will thus be seen that the working sides of the cutters G' and H', which revolve, as indicated by the arrow adjacent to them, move in the same direction as the board being operated upon is fed. All workers of wood are familiar with the fact that such cutters moving in the direction of the feed do their work more smoothly than if moved against it. In the main frame is also the shaft K, provided with a pulley $K^2$, around which the belt $i$ also passes. Upon this shaft is a series of saws K', each saw adapted to work midway between the cutters G' and H'. The operation will be readily understood. The board J, as shown in Fig. 5, first passes the cutters that form what is to be the rounded sides of the slats. The board next passes over the saws, which make two of the parts operated upon by the cutters. Slats as used on harvesting machinery are preferably of the form of which a section is shown in Fig. 10. The rounded side of the slat is of course produced by the cutters G' and H' and the flat side subsequently by the saws K'. In order that the boards may be properly fed to the cutters and saws, feeding-rollers L' and M', mounted upon the shafts L and M, suitably journaled in the frame, are provided. In order to operate the feed-rollers, a pulley N is applied to the shaft I. An idle shaft O is also journaled in the frame, and on this the pulley O', which is connected to pulley N by means of belt $n$. Upon the shaft also is the smaller pulley $O^2$. Around this smaller pulley is thrown the cross-belt $o$, which passes around the pulley P' upon the shaft P. Upon the shaft P and secured to pulley P' is a pinion $p$, meshing into the gears $L^2$ and $M^2$, which are fixed to the shafts L and M. Upon the shaft R, suitably mounted in the frame, is the pulley R', having upon the end thereof the pinion $r$, adapted to mesh into the gear $R^2$ on the shaft $R^3$. Upon this shaft is a sprocket-wheel $R^4$. At the other end of the main frame is the idle sprocket-wheel $r^3$. Around the sprocket-wheels is thrown the chain $r'$, having the teeth $r^2$ such distance apart that the board may be moved over the table between them. The teeth of the chain thus force the board into position to be engaged by the feeding-roller M'.

As before stated, the cutter B' is made adjustable to correspond with any length of slat to be produced. In order that it may be adjusted, this shaft $B^3$ is journaled on a sliding block $S'$. This block is guided by ways on the vertical plate S. Upon the end of this plate is the lug $s$, through which the screw-shaft $s'$ passes. In the block $S'$ is a nut into which the screw-shaft threads. By adjustment of the screw-shaft the cutter-head is moved in either direction at will.

$r^4$ is an idle sprocket-wheel upon the main frame, under which the slack portion of the chain moves.

The operation is a follows: The operator places a board upon the table and by means of the lever C, through the instrumentality of the stops $C^6$ and $C^7$, moves the board between the cutter-heads, where the ends are rounded. By a second movement the board is forced to position to be engaged by the feeding-chain $r'$, which carries it endwise to the feeding-rollers. The cutter-heads then operate, and the saws follow.

$r^5$, $r^6$, and $r^7$ are springs that hold the board down close to the table while being carried to the feeding-roller.

Any preferred mechanism may be employed to give the several essential parts the relative operation described, that shown being preferred. I do not wish, therefore, to be understood as limiting myself to the precise mechanism shown and described, as it is obvious that after pointing out my improvements many immaterial modifications may be made in the operating and connecting mechanism without departing from the spirit of my invention. It is also obvious that in case but one end of the slat needs to be finished one of the cutter-heads B B' may be dispensed with—as, for example, the fixed head B—the guide $a^{10}$ serving to guide and hold the material firmly against the remaining cutter-head B'. It is also obvious that when desired by simply dispensing with one series of members of the opposing cutters—as, for example, H'—a series of parallel grooves will be formed which will in their direction be transverse to the lines of operation made by the cutter-heads B B'. If preferred, the saws K' may in such case also be removed, when the result will be a series of parallel grooves in a single board arranged as described. These modifications are contemplated by me, and my improved machine is particularly constructed with the object in view of securing such modified operations.

I claim—

1. In a machine for producing a number of finished slats from a single piece of stock, the combination of a transversely-slotted bed or table, a cutter-head arranged to act upon the edge of said stock, manually-operated feeding means movable in the slots of the bed or table for presenting the material to said head, guides on the bed or table for directing the material into proper relation to the cutter-head as it is fed by the manually-operated means, pairs of cutters acting on opposite surfaces of the stock in the direction of its length, saws arranged to sever the stock on lines substantially parallel with and between the lines of separation made by the cutters, feeding mechanism for directing the stock to the cutters and saws, and devices separate from and actuated by the manually-operated feeding means for engaging the stock after it has been fed past the cutter-heads and delivering it to the said feeding mechanism.

2. In a machine for producing a number of finished slats from a single piece of stock, the combination of a transversely-slotted bed or table, a cutter-head arranged to act upon the edge of the stock, manually-operated feeding means reciprocal in the transverse slots of the bed or table for presenting the material to said cutter-head, pairs of cutters acting on opposite surfaces of the stock in the direction of its length, saws arranged to sever the stock on lines substantially parallel and between the lines of separation made by the cutters, feeding mechanism for directing the stock to the cutters and saws, transferring devices separate from and actuated by the manually-operated feeding means to deliver the stock to said feeding mechanism, and instrumentalities for elastically holding the stock upon the bed or table while being acted upon by the manually-operated feeding means and the transferring devices.

3. In a machine for producing a number of finished slats from a single piece of stock, the combination of a bed or table provided with transverse slots, cutter-heads arranged on said bed or table to act upon the ends of the stock, slides movable transversely of said bed or table in said slots and provided at different points in their length with separate feeding and transferring devices, pairs of cutters disposed to act upon opposite surfaces of the stock lengthwise thereof, and feeding mechanism for directing the stock between said cutters, the separate feeding devices carried by the slides acting to pass the stock between the cutter-heads, and the transferring devices, adapted to engage said stock after it has passed the cutter-heads and transfer the stock to the said feeding mechanism.

4. In a machine for producing a number of finished slats from a single piece of stock, the combination of a bed or table, cutter-heads arranged thereon to act upon the ends of the stock, guides upon said bed for directing the stock to and past the heads, means for elastically holding the stock down upon the bed, a rock-shaft $C'$ having an operating-lever C, reciprocating feed-bars sliding in grooves in the bed, and provided with fixed teeth $c^6$, $c^7$, and yielding teeth $c^8$, $c^9$, and arms $c$, $c'$, projecting from the rock-shaft and connected to the feed-bars.

5. In a machine for producing a number of finished slats from a single stock, the combination of a bed or table, cutter-heads arranged thereon to act upon the ends of the stock, guides upon said bed for directing the stock to and past the heads, a rock-shaft C', having an operating-lever C, guides $a^6$, $a^7$ projecting from the bed, reciprocating feed-bars sliding in grooves in the bed, arms $c$, $c'$ projecting from the rock-shaft and having slotted upper ends, and lugs $c^4$, $c^5$ on the feed-bars sliding in the guides $a^6$, $a^7$.

In testimony whereof I affix my signature in presence of two witnesses.

GEORGE W. PACKER.

Witnesses:
CHAS. N. CHAMBERS,
MARVIN CRAMER.